United States Patent
Koba et al.

Patent Number: 5,532,054
Date of Patent: Jul. 2, 1996

[54] MOLDING MATERIAL

[75] Inventors: Tomohita Koba; Toshiyuki Nakakura, both of Yokohama; Hideo Sakai, Ebina; Misao Masuda, Fujisawa; Satoru Kishi, Yokosuka; Chiaki Maruko, Kamakura, all of Japan

[73] Assignee: Mitsui Toatsu Chemicals, Inc., Tokyo, Japan

[21] Appl. No.: 307,031

[22] Filed: Sep. 16, 1994

Related U.S. Application Data

[63] Continuation of Ser. No. 870,117, Apr. 17, 1992, abandoned, which is a continuation of Ser. No. 398,451, Aug. 25, 1989, abandoned.

[30] Foreign Application Priority Data

Sep. 20, 1988 [JP] Japan .................................. 63-237261

[51] Int. Cl.$^6$ ...................................................... D04H 1/00
[52] U.S. Cl. ............................ 428/294; 428/332; 428/359; 428/367; 428/375; 428/378; 428/392; 428/396; 428/401; 428/402; 428/406; 428/407
[58] Field of Search ........................................ 428/392, 396, 428/401, 402, 332, 407, 400, 367, 375, 378, 294, 295

[56] References Cited

U.S. PATENT DOCUMENTS

| | | | |
|---|---|---|---|
| 2,877,501 | 3/1959 | Bradt | 428/372 |
| 3,822,177 | 7/1974 | Moked | 428/402 |
| 3,984,603 | 10/1976 | Zechinati et al. | 428/402 |
| 4,037,011 | 7/1977 | Hattori et al. | 428/392 |
| 4,169,186 | 9/1979 | Tazaki et al. | 428/392 |
| 4,559,262 | 12/1985 | Cogswell et al. | 428/407 |
| 4,818,615 | 4/1989 | Luxon et al. | 428/407 |
| 5,019,450 | 5/1991 | Cogswell et al. | 428/402 |

FOREIGN PATENT DOCUMENTS

| | | |
|---|---|---|
| 49-41105 | 11/1974 | Japan . |
| 61-229534 | 10/1986 | Japan . |
| 61-229535 | 10/1986 | Japan . |
| 61-229536 | 10/1986 | Japan . |

*Primary Examiner*—Patrick J. Ryan
*Assistant Examiner*—J. M. Gray
*Attorney, Agent, or Firm*—Burns, Doane, Swecker & Mathis

[57] ABSTRACT

A molding material shaped like a plate and comprising a composite of continuous fibers and thermoplastic resin wherein each of the filaments which form the continuous fiber is coated around the surface thereof with the thermoplastic resin. Although the molding material has a high density of reinforcing fibers therein, it provides excellent distribution of fibers in the molding process; few of its fibers are broken, and its mechanical strength is considerably enhanced when its specific surface is made larger than a certain value. This molding material can be used for injection, extrusion and compression moldings.

19 Claims, 1 Drawing Sheet

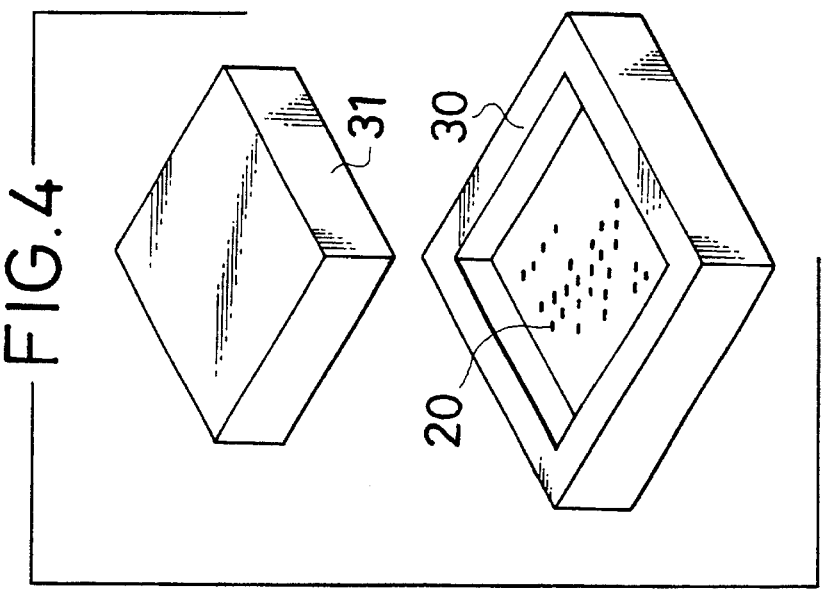
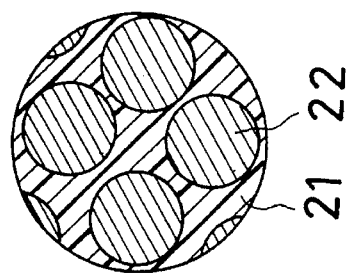
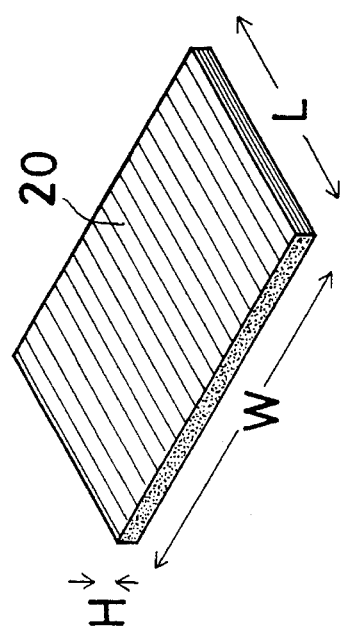
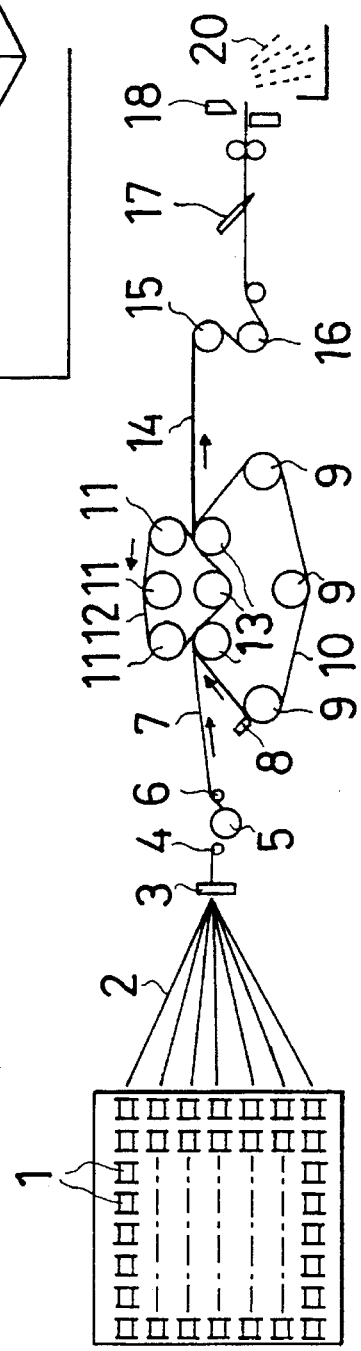

MOLDING MATERIAL

This application is a continuation of application Ser. No. 07/870,117, filed Apr. 17, 1992, now abandoned, which is a continuation of application Ser. No. 07/398,451, filed Aug. 25, 1989, now abandoned.

BACKGROUND OF THE INVENTION

The present invention relates to a molding material which can be used for injection, extrusion and compression moldings and provide a molded product having a better distribution of fibers with fewer fibers being broken, and with higher mechanical strength.

According to conventionally well-known methods of producing a composite of thermoplastic resin reinforced with fibers, glass fibers, each about 3 mm long, for example, are dry-blended with the thermoplastic resin and mixed and granulated into pellets by means of the extruder.

In these conventional methods, however, each of the glass fibers tend to come loose into filaments which intertwine and cling to one another when the dry-blended material is mixed by the extruder. As a result, the glass fibers are not distributed uniformly in the pellet. Further, the glass fibers are broken and the glass fibers of various lengths are thus contained non-uniformly in the pellet, with their median held about 0.3 mm. These factors reduce the reinforcing effect of the thermoplastic resin with glass fibers.

Although the upper limit of the glass fibers contained or mixed is conventionally 30 weight %, a molding material in which the glass fibers are contained to a higher extent has been used in an attempt to enhance mechanical strength. When the weight percentage of the glass fibers is higher than 30, however, it is difficult to uniformly distribute the glass fibers in the pellets during the mixing process. Therefore, such molding material containing the glass fibers at a value higher than 30 weight % cannot be provided.

In order to solve the above-mentioned drawbacks, there have been proposed some methods of coating the glass fibers with thermoplastic resin. According to the method disclosed by Japanese Patent Publication Sho 49-41105, for example, molten thermoplastic resin is introduced into openings of the die, while passing bundles of glass fibers through the openings, by the extruder to coat the bundles of glass fibers with the thermoplastic resin, and the bundles of glass fibers thus coated are cooled and then cut by a certain length to provide cylindrical pellets of a molding material. With this molding material however, the fibers in the pellets are the same length as the pellets, keeping them long, before the pellets are molded, but as the fibers are contained to a higher extent, they cannot be distributed uniformly in the molded product. Further, most of the fibers contained are broken because they are shear-stressed while being passed between the barrel and the screw at the supply zone in the extruder, and the average length of the fibers in the molded product becomes about 0.5 mm. This prevents the fibers from providing their reinforcing effect to the desired extent.

SUMMARY OF THE INVENTION

The problems of non-uniform fiber distribution and broken fibers at the molding process in the extruder are closely related to the specific surface of the molding material. When this specific surface is kept higher than a certain value, thermoplastic resin in the molding material can be molten for a short time at the supply zone in the extruder. Even when a high density of fibers are contained in the molding material, therefore, the problems of non-uniform fiber distribution and broken fibers can be solved.

The object of the present invention is therefore to provide a molding material which makes it possible to prepare a molded product wherein the fibers are distributed uniformly and few of the fibers are broken even though high density of fibers is used, and whose mechanical, particularly impact strength is considerably enhanced.

BRIEF DESCRIPTION OF THE DRAWINGS

FIG. 1 is an isometric view showing the structure of a preferred molding material according to the present invention.

FIG. 2 is an enlarged view showing a portion of the molding material.

FIG. 3 shows an example of the apparatus for preparing the molding material according to the present invention.

FIG. 4 is an isometric view showing an example of the compression molding die.

DETAILED DESCRIPTION OF THE PREFERRED EMBODIMENTS

According to the present invention, there is provided a molding material shaped into plate-like pieces and comprising reinforcing fibers of filaments, and a thermoplastic resin impregnated into and coated around the reinforcing fibers. The material is characterized in that the amount of reinforcing fibers ranges from 50 weight % to 90 weight %, that at least one side of each of the plate-shaped pieces is shorter than 1 mm, and that the specific surface of the molding material is larger than 20 $cm^2/g$.

An example of the molding material according to the present invention will be described referring to FIG. 1. In FIGS. 1 and 2, reference numeral 20 represents a piece of the molding material, 21 a thermoplastic resin and 22 a filament. Further, reference symbol L denotes the length of a plate-shaped piece of the molding material or length of the fibers contained in the piece and it ranges from 1.0 mm to 30 mm. When the length of the fibers is shorter than 1.0 mm, sufficient reinforcing effect cannot be attained, but when it is longer than 30 mm, Pieces of the molding material are intertwined in the hopper, making it difficult to supply the pieces of the molding material into the melting cylinder of the molding machine from the hopper.

The specific surface of the molding material can be obtained from the following equation:

Specific surface $=2|L \times H + W \times (L+H)|/L \times W \times H \times P$ wherein L represents the length (cm) of the molding material, W the width (cm) thereof, H the thickness (cm) thereof and P the specific weight ($g/cm^3$) thereof.

For the purpose of setting the specific surface to a large value, it is preferable that at least one of the width and thickness is made smaller than 1.0 mm, more preferably smaller than 0.5 mm.

According to the present invention, it is preferable that the specific surface is made larger than 20 $cm^2/g$, more preferably larger than 30 $cm^2/g$, most preferably larger than 40 $cm^2/g$. When the specific surface is smaller than 20 $cm^2/g$, it takes a long time for the thermoplastic resin in the molding material to be made molten at the injection or extrusion molding process in the extruder. This causes the fibers to be distributed non-uniformly and to be broken at the supply zone of the extruder. This is not preferable.

It is desirable that the thickness H is made larger than 0.1 mm, considering the easiness of handling the molding material.

The following can be used as reinforcing fibers: Glass fibers made of E- and S-glasses; carbon fibers of the polyacrylonitrile, pitch and rayon groups; aromatic polyamide fibers, such as those sold under the trademark "KEVLAR" by du Pont Inc.; silicon carbide fibers such as those sold under the trademark "NIKALON" by Japan Carbon Inc.; and metallic fibers. These reinforcing fibers can be used independently of the others or a combination thereof.

The diameter of fibers used by the present invention changes depending on their type. When glass fibers are used, for example, their diameter ranges 5–25 μm, but it is more preferable that their diameter is made smaller, considering the mechanical characteristic of the molding material in which they are contained. It is also preferable that the reinforcing fibers are surface-treated when their adhesiveness to the thermoplastic resin is considered. When glass fibers are used, therefore, it is particularly preferable that they are treated by coupling agent of the silane, titanate, and other groups.

The thermoplastic resin employed by the present invention is not specified but may be selected depending upon the purpose of using the molding material. The following, for example, can be used as the thermoplastic resin: Polypropylene, styrene acrylonitrile copolymer, polystyrene, acrylonitrile butadiene styrene copolymer (including methylmethacrylate butadiene styrene, methylmethacrylate acrylonitrile butadiene styrene, and acrylonitrile butadiene α-methylstyrene copolymers), polyphenyleneether (including denatured polyphenyleneoxide), polyethylene, polyoxymethylene, polycarbonate, polyamide, polymethylmethacrylate, polyvinylchloride, polyethyleneterephthalate, polybuthyleneterephthalate, polyphenylenesulfide, polysulfone, polyethersulfone, polyetheretherketone, polyetherketone, polyimide, and polyetherimide.

The amount of reinforcing fibers contained in the molding material according to the present invention ranges from 50 weight % to 90 weight %. When it is smaller than 50 weight %, the effect of containing the fibers at a high density according to the present invention cannot be obtained completely. When the molding material is used as the masterbatch, which will be described later, it is not preferable because of the economy, of the molding material used. When the amount of the thermoplastic resin becomes larger than 90 weight %, the surface of each of filaments cannot be sufficiently coated with the thermoplastic resin. This is not desirable.

A molding material according to the present invention comprising reinforcing fibers of filaments, and thermoplastic resin coated around and impregranted into filaments of the fibers, is formed like a plate in which filaments of the reinforcing fibers are impregnated and coated with the thermoplastic resin, and cut by a certain length to provide pieces of the plate-shaped molding material.

It is preferable in the present invention that 90% or more of the surface of each of those filaments which form the reinforcing fibers is coated with the thermoplastic resin.

The manner of impregnating the filaments of the reinforcing fibers with the thermoplastic resin and coating the surface of each of the filaments with the thermoplastic resin is not critical in the case of the present invention, but there can be employed, for example, hot-melt or fluid-bed processes wherein the fibers are impregnated with the resin in the molten state, or with its powder floated in the air or suspended in a liquid such as water.

A typical example of the molten resin impregnating process is disclosed by preliminarily-opened Japanese Patent Applications Sho 61-229534, -229535, -229536 and Japanese Pat. Appln. No. 61-216253.

An example of the molten resin impregnating process will be described referring to FIG. 3.

Rovings 2 of long fibers pulled out of plural bobbins 1 are aligned in a direction by an aligning means 3 and then passed round tension adjusting rollers 4, 5 and 6 to form a sheet of fibers 7. Sheets of fibers which are aligned in various directions can be employed by the present invention in addition to the sheet of fibers which are aligned in a direction.

A resin which has been heated and melted in an extruder (not shown) is applied to the surface of a lower belt 10, which is heated by heating rollers 9, through a die 8. An upper belt 12 is heated by heating rollers 11.

The sheet 7 is passed round impregnating rollers 13, while being kept tensioned and sandwiched between the upper and lower belts 12 and 10.

A composite 14 of the continuous fibers and thermoplastic resin thus prepared is slit in a direction parallel to the fibers by a slitter 17 to have a desired width. Or plural sheets of the composites 14 are piled one upon the others and heatpressed, if necessary, to have a desired thickness and then slit in a direction parallel to the fibers by the slit 7 to have a desired width. The single composite 14 or laminated composites 14 is (are) cut in a direction perpendicular to the fibers by a cutter 18 to have a desired length. Rectangular pieces of molding material 20 can be thus prepared. Reference numerals 15 and 16 in FIG. 3 represent pulling rollers.

The process of laminating and heat-pressing plural sheets of the composites 14 can be carried out as follows, for example. The surfaces of the composites 14 are heated to a temperature higher than the softening point of the thermoplastic resin and then laminated one upon the others, or the composites 14 are laminated one upon the others and then heated to a temperature higher than the softening point of the resin in a heating furnace. The composites 14 thus laminated are cooled to a temperature lower than the hardening temperature of the resin under pressure, while passing them between cooling nip rollers.

The molding material thus prepared can be applied, as it is, to the injection or extrusion molding. Or the molding material thus prepared is dry-blended with a thermoplastic resin, which is not reinforced with fibers, to have a desired amount of fibers. That is the molding material thus prepared is applied, as the so-called masterbatch, to the injection or extrusion molding. The molding material can be applied to the compression molding as well. Even when the molding material is applied to compression molding, it can be closely contacted with the mold because it is shaped like a plate or scale. Because the specific surface of the molding material is large, the resin in the material can be melted faster and the molding material can be thus molded in a shorter time than in the case of a conventional process. The conventional molding material is usually shaped like a column, but the one of the present invention is shaped like a scale. Pieces of the molding material prepared according to the present invention can be more easily positioned on the mold.

Some examples of the present invention will be described, but it should be understood that the present invention is not limited to these examples.

EXAMPLE 1

Using the apparatus shown in FIG. 3, a molding material was prepared from polypropylene and glass fibers as follows.

100 strings of the rovings 2 of glass fibers (fiber diameter 13 μm and 1600 strings per bundle) pulled out of 100 pieces of bobbins 1 were aligned in a direction by the aligning means 3 and then passed round the tension adjusting rollers 4, 5 and 6 to form a sheet 7 of fibers which was 200 mm wide.

Polypropylene which was heated to 210° C. and melted in the extruder (not shown) was applied, 145 μm thick, to the surface of the lower belt 10 which was heated to 220° C. by three rollers 9. The sheet 7 was passed round three resin impregnating rollers 13, each of which had a diameter of 240 mm and was heated to 220° C., under a tension of 150 kg and at a speed of 50 cm/minute, while being sandwiched between the lower belt 10 and the upper belt 12, which was heated to 220° C. by three rollers 11. The composite 14 of polypropylene and glass fibers thus obtained was cooled to 100° C., pulled by the pulling rollers 15 and 16, slit in width at an interval of 5 mm by the slitter 17, and cut, 3 mm long, by the cutter 18, so that a molding material, 0.24 mm thick, having 70 weight % of the glass fibers contained could be prepared.

The specific surface of the molding material was 58 $cm^2/g$.

57 weight parts of the molding material and 43 weight parts of polypropylene resin not reinforced with fibers were dry-blended and a sample having 40 weight % of the glass fibers contained was prepared by the injection molding machine.

The sectioned face of the sample was viewed through the scanning electron microscope. The distribution of the fibers in the sample was excellent and no blocking was seen.

The impact strength of the sample was measured according to Izod test and the lengths of the fibers contained in the sample was also measured. Results are as shown in Table 1. The median of lengths of the fibers contained was about 1.6 mm and as compared with the conventional molded products, broken fibers were fewer at the injection molding process and the impact strength of the sample measured according to Izod test was about two times higher.

COMPARISON EXAMPLE 1

Polypropylene melted by the extruder was introduced into the crosshead die provided with an opening, which had a diameter of 3 mm and a length of 300 mm. 9 strings of the glass fibers which were used in Example 1 were contacted and coated with the molten polypropylene, while being passed through the opening of the crosshead die, which was heated to 220° C.

The product thus prepared was cooled to a temperature lower than 100° C. and cut 3 mm long. A molding material having a diameter of 3 mm and 50 weight % of the glass fibers contained was thus obtained. The specific surface of the molding material was 16 $cm^2/g$.

The molding material was dry-blended as shown in Table 1 and a sample having 40 weight % of the glass fibers contained was prepared by the injection molding machine which was used in Example 1. The sectioned face of the sample was viewed through the scanning electron microscope. The distribution of fibers in the sample was not sufficient and blocking was found.

The impact strength of the sample was measured according to Izod test and lengths of the fibers contained in the sample were also measured. Results are as shown in Table 1. The median of the lengths of the fibers distributed in the sample was about 0.6 mm and as compared with Example 1, broken fibers were more remarkably found at the injection molding process. As the result, the impact strength of the sample measured according to Izod test was considerably lowered.

COMPARISON EXAMPLE 2

Five sheets of the glass fibers composite 14 which was processed and prepared same as in Example 1 were laminated one upon the others, heat-pressed at a pressure of 50 kg/cm while being passed between a pair of heating rollers which were heated to 200° C., and processed same as in Example 1 to thereby provide a molding material, 3 mm long, 1.20 mm thick, 5 mm wide and having 70 weight % of the glass fibers contained. The specific surface of the molding material thus prepared was 17 $cm^2/g$.

The molding material was dry-blended same as in Example 1 and then injection-molded to provide a sample which had 40 weight % of the glass fibers contained.

The sectioned face of this sample was viewed through the scanning electron microscope. The fibers contained were blocked to a considerable extent and the distribution of the fibers were not sufficient.

The impact strength of the sample was measured according to Izod test and lengths of the fibers contained were also measured. Results are as shown in Table 1. The median of the lengths of the fibers distributed in the sample was about 0.7 mm. Broken fibers at the molding process were remarkably found and the impact strength of the sample measured according Izod test was lowered.

EXAMPLES 2–4

Fibers and resins shown in Table 1 were used instead of those used in Example 1 and processed same as in Example 1 to provide composites.

These composites were slit in width and cut to have such lengths as shown in Table 1. Molding materials were thus prepared. These molding materials were dry-blended, at such rates as shown in Table 1, with resin not reinforced with fibers and then injection-molded to provide samples.

The sectioned faces of the samples were viewed through the scanning electron microscope. The distribution of fibers were excellent in any of the samples and no blocking was found in them.

The impact strength of each of the samples was measured according to Izod test and lengths of fibers contained in each of the samples were also measured similarly to Example 1. Results are as shown in Table 1.

EXAMPLES 5–10

Fibers and resins shown in Table 2 were used instead of those used in Example 1 and processed same as in Example 1 to provide composites.

These composites were slit 5 mm wide and cut to have such lengths as shown in Table 2 to prepare molding materials. These molding materials were dry-blended, at such rates as shown in Table 2, with resin not reinforced with fibers and then injection-molded to provide samples.

The sectioned face of each of the samples was viewed through the scanning electron microscope. The distribution of the fibers contained was excellent in any of the samples and no blocking was found in them.

The impact strength of each of the samples was measured according to Izod test and lengths of the fibers contained in each of the samples was also measured, as seen in Example 1. Same results as those in Example 1 were obtained.

EXAMPLE 11

The molding material prepared in Example 9 was dry-blended with PEEK (or polyetheretherketone) and adjusted to have 30% of the fibers contained. This dry-blended was extruded by the extruder to provide a sample which is shaped like a column having a diameter of 30 mm.

The sectioned face of this sample was viewed through the scanning electron microscope. The distribution of the fibers contained was excellent and no blocking was found in it.

EXAMPLE 12

300 g of the molding material 20 prepared in Example 1 was uniformly placed in a female mold half 30 to which a release agent (FREKOTE 44 made by U.S. FREKOTE Inc.) was applied and which was shown in FIG. 4, and a male mold half 31 to which the release agent was also applied was then set onto the female mold half 30. The mold was left in a heating furnace, which was heated to 300° C., until the mold was heated to 230° C. The mold was then quickly carried into the compression molding machine which was provided with a pair of plates of room temperature, and pressed for twenty minutes at a pressure of 50 kg/cm$^2$. A molded product, 300×300×2.0 mm, was thus prepared.

The surface of this molded product was viewed by eyes. No fiber came up to the surface of the product, the fibers were excellently distributed in the product and the product had excellent surface smoothness.

TABLE 1

|  | Example 1 | Example 2 | Example 3 | Example 4 | Comparison Example 1 | Comparison Example 2 |
|---|---|---|---|---|---|---|
| Molding material |  |  |  |  |  |  |
| Resin | PP | PP | AS | PA66 | PP | PP |
| Fiber | GF | GF | GF | CF | GF | GF |
| Fiber length (mm) | 3.0 | 6.0 | 3.0 | 3.0 | 3.0 | 3.0 |
| Fiber diameters (μm) | 13 | 13 | 13 | 7 | 13 | 13 |
| Rate of fibers contained (Weight %) | 70 | 80 | 70 | 60 | 50 | 70 |
| Specific surface (cm$^2$/g) | 58 | 28 | 57 | 100 | 16 | 17 |
| Weight parts of molding material | 57 | 50 | 57 | 67 | 80 | 57 |
| Weight parts of resin not reinforced with fibers | 43 | 50 | 43 | 33 | 20 | 43 |
| Molded product |  |  |  |  |  |  |
| Rate of fibers contained (Weight %) | 40 | 40 | 40 | 40 | 40 | 40 |
| Impact strength by izod test (Kg · cm/cm) | 30 | 29 | 10 | 20 | 13 | 12 |
| Average fiber length (m) | 1.6 | 1.5 | 1.0 | 1.4 | 0.6 | 0.7 |

Note;
PP: Polypropylene
AS: Styrene acrylonitrile copolymer
PA66: Nylon 66
GF: Glass fibers
CF: Carbon fibers

TABLE 2

|  | Example 5 | Example 6 | Example 7 | Example 8 | Example 9 | Example 10 |
|---|---|---|---|---|---|---|
| Molding material |  |  |  |  |  |  |
| Resin | K | PET | PBT | PES | PEEK | PEI |
| Fiber | GF | GF | GF | CF | GF | CF |
| Fiber length (mm) | 5 | 5 | 5 | 5 | 5 | 5 |
| Fiber diameters (μm) | 13 | 13 | 13 | 7 | 7 | 7 |
| Rate of fibers contained (Weight %) | 60 | 60 | 60 | 65 | 65 | 65 |
| Specific surface (cm$^2$/g) | 49 | 48 | 48 | 105 | 106 | 106 |
| Weight parts of molding material | 50 | 50 | 50 | 46 | 46 | 46 |
| Weight parts of resin not reinforced with fibers | 50 | 50 | 50 | 54 | 54 | 54 |
| Molded product |  |  |  |  |  |  |
| Rate of fibers contained (Weight %) | 30 | 30 | 30 | 30 | 30 | 30 |
| Distribution of fibers | Excellent | Excellent | Excellent | Excellent | Excellent | Excellent |
| Blocking | not found | not found | not found | not found | not found | not found |

Note;
PC: Polycarbonate
PES: Polyethersulfone
PET: Polyethyleneterephthalate

TABLE 2-continued

|  | Example 5 | Example 6 | Example 7 | Example 8 | Example 9 | Example 10 |
| --- | --- | --- | --- | --- | --- | --- |

PEEK: Polyetheretherketone
PBT: Polybuthyleneterephthalate
PEI: Polyetherimide

We claim:

1. A molding material having a three-dimensional shape with length, thickness and width dimensions, and a specific surface (SS) larger than 20 cm$^2$/g as defined by the equation SS=2{L×H+ W×(L+H)}/(L×W×H×P) wherein L is the length dimension, H is the thickness dimension, W is the width dimension and P is the specific weight of the molding material, said material comprising reinforcing fibers, each fiber thereof comprising a plurality of filaments, and a thermoplastic resin coated around the filaments of the reinforcing fibers and impregnated therein, wherein the reinforcing fibers are uniformly dispersed and aligned uniformly either along the length of the molding material or along the width of the molding material, wherein the length of the reinforcing fibers ranges from 1 to 30 mm and is substantially the same as the length of the molding material when uniformly dispersed and aligned uniformly along the length of the molding material or substantially the same as the width of the molding material when uniformly dispersed and aligned uniformly along the width of the molding material, wherein the amount of reinforcing fibers ranges from 50 weight % to 90 weight % with the proviso that the amount and type of reinforcing fibers together with the amount and type of thermoplastic resin is selected to provide a specific weight for the molding material effective to provide a specific surface larger than 20 cm$^2$/g, and wherein the thickness of the molding material is shorter than 1 mm with the proviso that the length, width, and thickness of the molding material, together with the specific weight of the molding material, are selected to provide a specific surface of the molding material larger than 20 cm$^2$/g.

2. The molding material according to claim 1 wherein said reinforcing fibers are glass fibers.

3. The molding materials according to claim 2 wherein the amount of reinforcing fibers ranges from 60 weight to 90 weight %.

4. The molding material according to claim 3 wherein the amount of reinforcing fibers ranges from 70 weight % to 90 weight %.

5. The molding material according to claim 1 wherein said reinforcing fibers are carbon fibers.

6. The molding material according to claim 5 wherein the amount of reinforcing fibers ranges from 60 weight % to 90 weight %.

7. The molding material according to claim 6 wherein the amount of the reinforcing fibers ranges from 70 weight % to 90 weight %.

8. The molding material according to claim 7, wherein at least one of the width and thickness is smaller than 0.5 mm.

9. The molding material according to claim 8 wherein the specific surface of said molding material is larger than 30 cm$^2$/g.

10. The molding material according to claim 9 wherein the specific surface of said molding material is larger than 40 cm$^2$/g.

11. A molding material according to claim 10, effective for injection molding.

12. A molding material according to claim 10, effective for extrusion molding.

13. The molding material according to claim 1 wherein the amount of reinforcing fibers ranges from 60 weight % to 90 weight %.

14. The molding material according to claim 13 wherein the amount of reinforcing fibers ranges from 70 weight % to 90 weight %.

15. The molding material according to claim 1, wherein at least one of the width and thickness is smaller than 0.5 mm.

16. The molding material according to claim 1 wherein the specific surface of said molding material is larger than 30 cm$^2$/g.

17. The molding material according to claim 16 wherein the specific surface of said molding material is larger than 40 cm$^2$/g.

18. A molding material according to claim 1, effective for injection molding.

19. A molding material according to claim 1, effective for extrusion molding.

* * * * *